US006681606B2

(12) United States Patent
Baukholt

(10) Patent No.: US 6,681,606 B2
(45) Date of Patent: Jan. 27, 2004

(54) DOOR-LOCKING DEVICE

(75) Inventor: Theo Baukholt, Kriftel (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/260,175

(22) Filed: Sep. 27, 2002

(65) Prior Publication Data

US 2003/0074935 A1 Apr. 24, 2003

(30) Foreign Application Priority Data

Oct. 8, 2001 (DE) ........................................ 101 49 478

(51) Int. Cl.[7] ......................... B60R 25/04; E05B 65/12

(52) U.S. Cl. ................................ 70/257; 292/DIG. 23; 292/DIG. 25

(58) Field of Search .................. 70/256, 257; 292/201, 292/216, DIG. 25, DIG. 23

(56) References Cited

U.S. PATENT DOCUMENTS

| | | | | |
|---|---|---|---|---|
| 4,364,249 A | * 12/1982 | Kleefeldt | 70/264 |
| 4,778,206 A | * 10/1988 | Matsumoto et al. | 292/201 |
| 4,794,268 A | * 12/1988 | Nakano et al. | 307/10.2 |
| 4,986,098 A | * 1/1991 | Fisher | 70/262 |
| 5,709,420 A | * 1/1998 | Umino | 292/216 |
| 5,715,713 A | * 2/1998 | Aubry et al. | 70/277 |
| 6,050,117 A | * 4/2000 | Weyerstall | 70/277 |
| 6,059,328 A | * 5/2000 | Gomi | 292/216 |
| 6,079,757 A | * 6/2000 | Aubry | 292/201 |
| 6,343,494 B2 | * 2/2002 | Roos et al. | 70/264 |
| 6,519,987 B1 | * 2/2003 | Weyerstall | 70/257 |
| 6,523,376 B2 | * 2/2003 | Baukholt et al. | 70/256 |
| 6,575,003 B1 | * 6/2003 | Dupont | 70/257 |

* cited by examiner

*Primary Examiner*—John B. Walsh
(74) *Attorney, Agent, or Firm*—Martin A. Farber

(57) ABSTRACT

A door-locking device having an inside door-handle element movable by an inside door handle. An outside door-handle element movable by an outside door handle. A driver element can be coupled in a form-fitting manner to the inside door-handle element and the outside door-handle element by a coupling. An authorization signal can be directed in a contact less manner to a control unit by a mobile authorization unit, and the outside door handle is assigned a switch by which, when the actuation of the outside door handle begins, a signal can be produced and directed to the control unit and when this signal and the authorization signal are present a drive can be activated by the control unit such that an uncoupling element can be driven to move from its uncoupled position into its coupled position by the drive.

16 Claims, 8 Drawing Sheets

Figure 1:
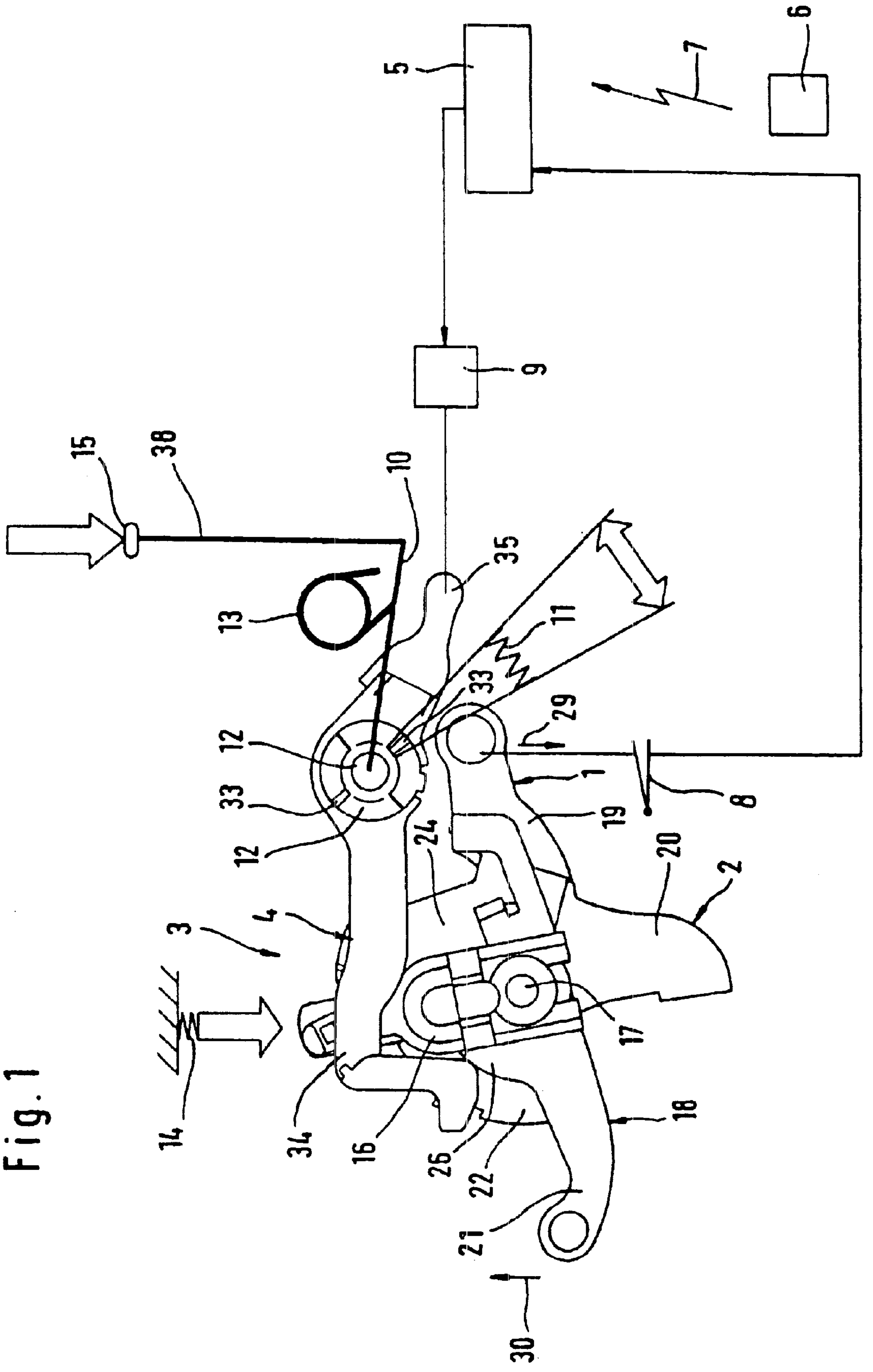

Fig. 2
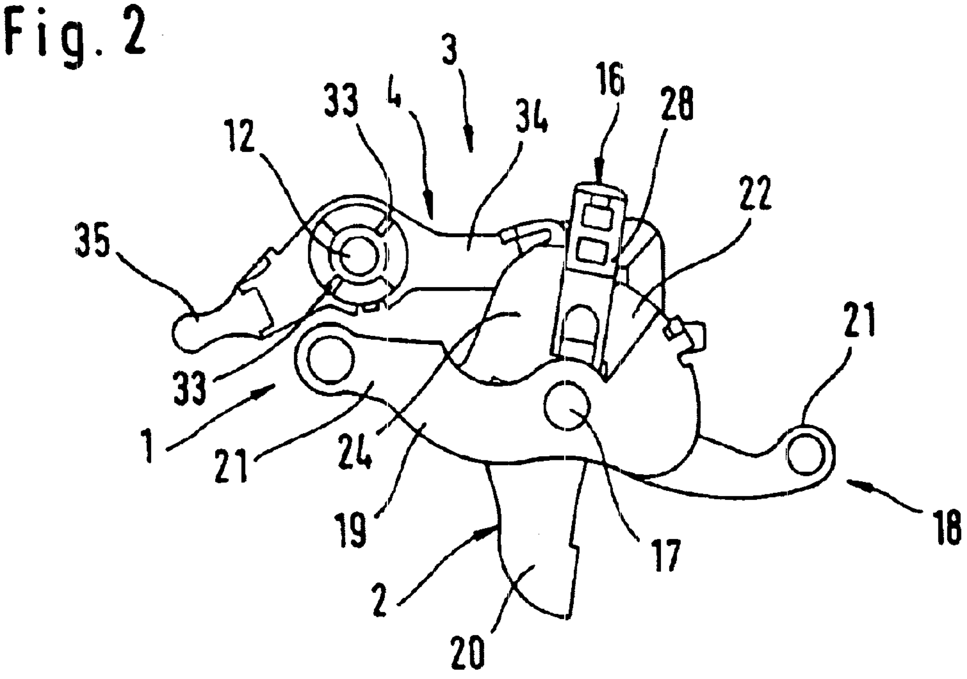
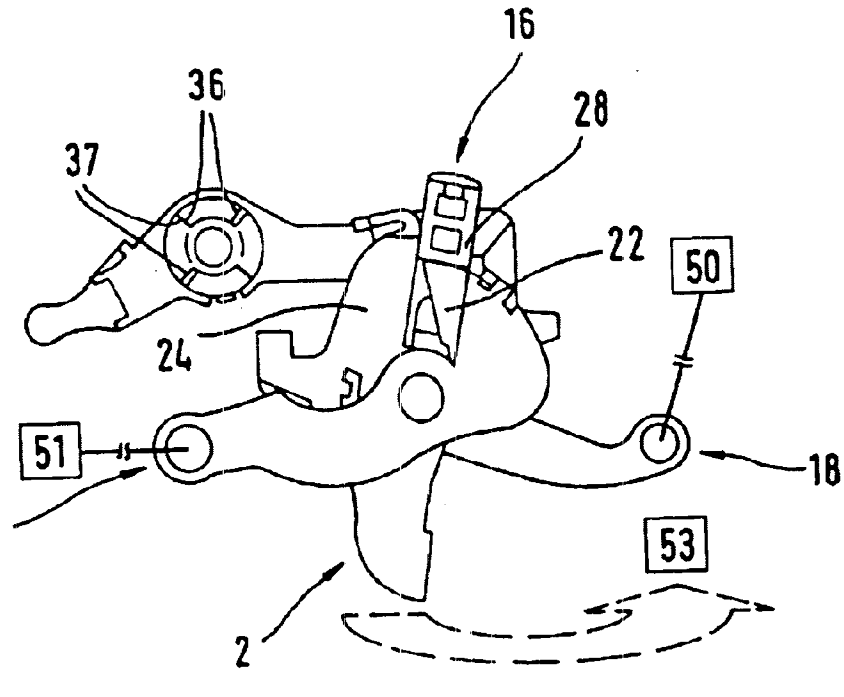
Fig. 3

Fig. 4
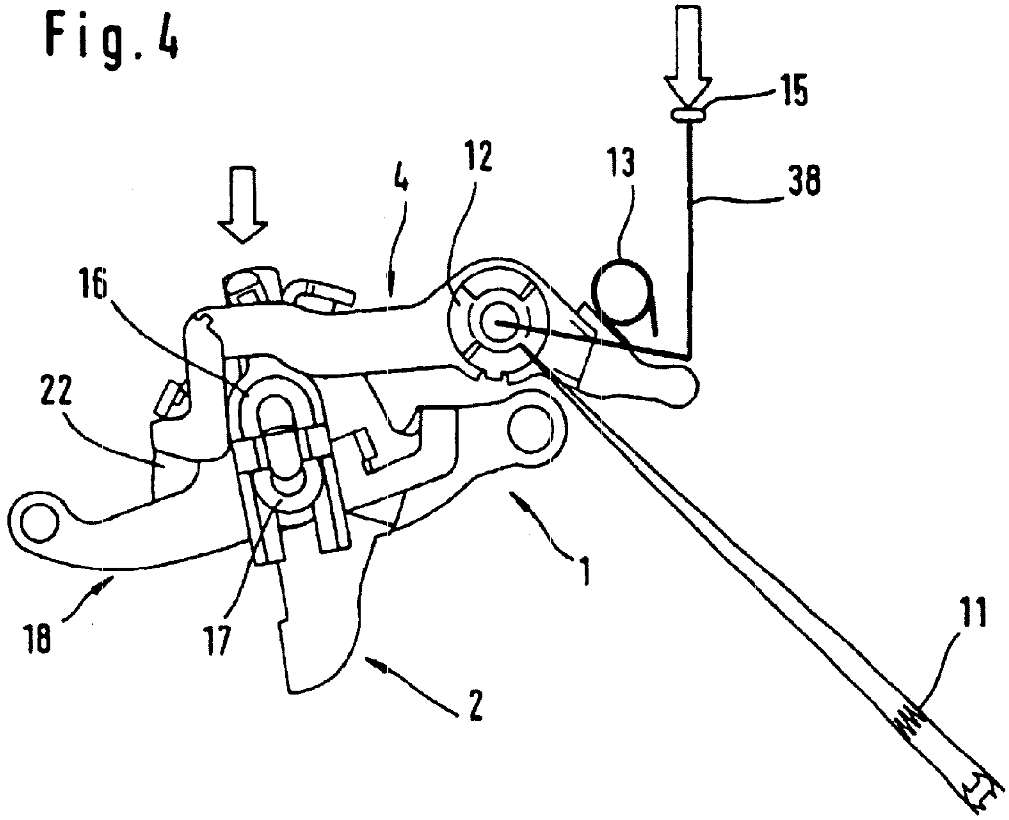
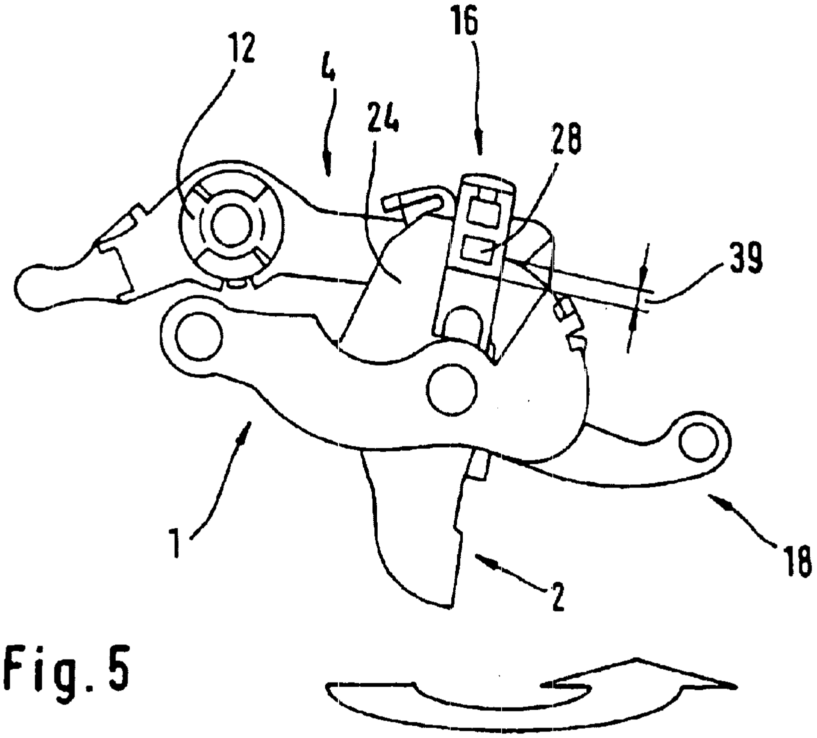
Fig. 5

Fig. 6
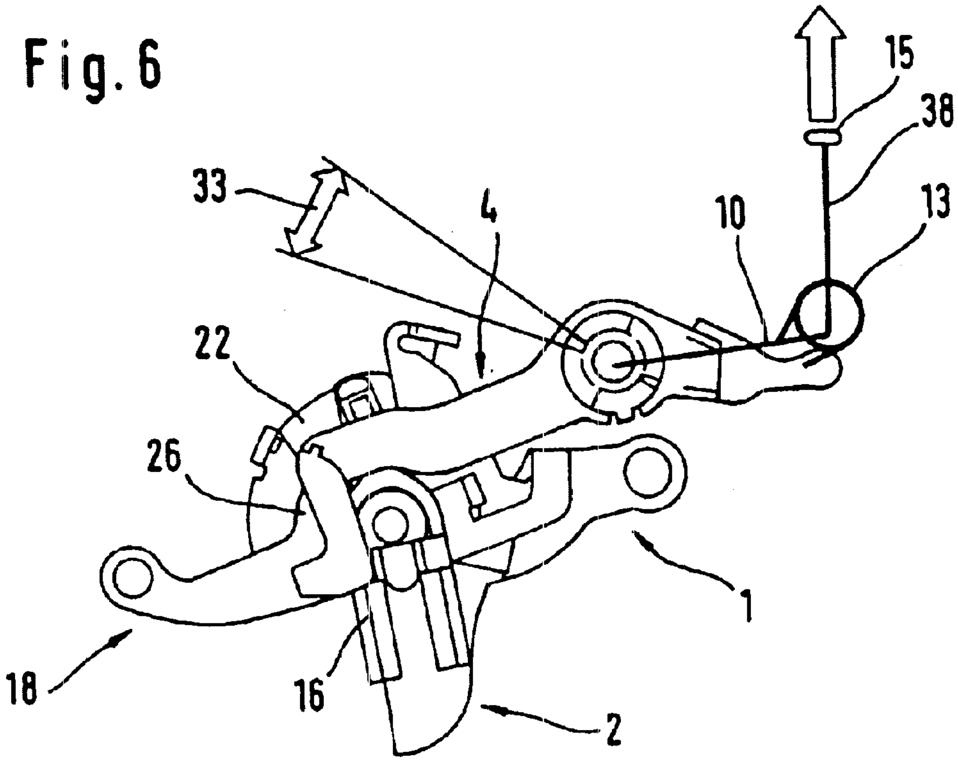
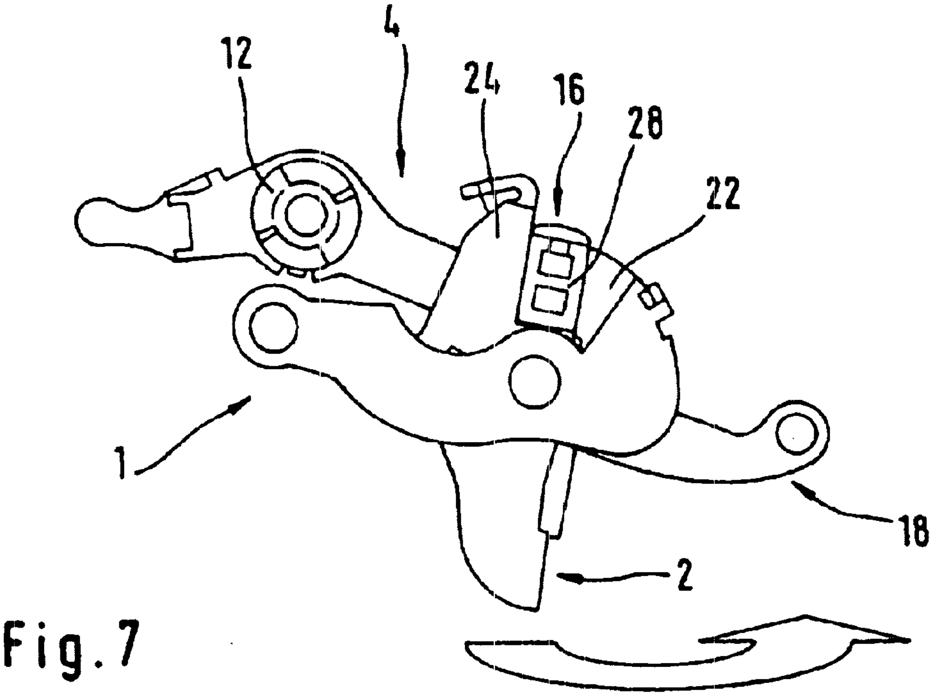
Fig. 7

DOOR-LOCKING DEVICE

FIELD AND BACKGROUND OF THE INVENTION

The invention relates to a door-locking device, in particular for a motor vehicle, having an inside door-handle element which can be moved from a closed position into an open position by virtue of an inside door handle being actuated, having an outside door-handle element which can be moved from a closed position into an open position by virtue of an outside door handle being actuated, and having a driver element which can be coupled in a form-fitting manner to the inside door-handle element and/or the outside door-handle element by a coupling and can be moved from an uncoupled closed position into a coupled open position by the inside door-handle element and/or the outside door-handle element and by means of which, in the coupled state, a catch of a door lock can be actuated, it being the case that the coupling can be driven to move counter to a spring force from its coupled position into its uncoupled position by an uncoupling element, and that an authorization signal can be directed in a contactless manner to a control unit by a mobile authorization unit, and the outside door handle is assigned a switch by means of which, when actuation of the outside door handle begins, a signal can be produced and directed to the control unit and, when this signal and the authorization signal are present, a drive can be activated by the control unit such that the uncoupling element can be driven to move from its coupled position into its uncoupled position by the drive.

Such door-locking devices are unlocked either by means of a key or by electromotive action following the actuation of a remote control arranged on a key. The unlocked door can then be opened by pulling on the outside door handle.

All that is still necessary here for opening the door is for the outside door handle to be actuated and the door to be pulled in the opening direction. There is no need to use a key or to actuate a remote control.

If an individual with a mobile authorization unit comes into the vicinity of the door which is to be opened, then the authorization signal emitted by the authorization unit is detected by the control unit. At the same time, the control unit is brought into a state in which it allows the signal of the switch on the outside door handle, when actuation of the outside door handle begins, to replace the uncoupled state of the outside door-handle element and driver element by a coupled state. By virtue of continued actuation of the outside door handle, the outside door-handle element is thus moved from its locked position into its unlocked position and, on account of the form-fitting coupling to the driver element, the catch of the door lock is moved, via said driver element, into its unlocked position.

The door is thus only opened by actuation of the outside door handle.

SUMMARY OF THE INVENTION

The object of the invention is to provide a door-locking device of the type mentioned in the introduction which allows a more straightforward opening operation of the door.

This object is achieved according to the invention in that the displacement of the uncoupling element between the uncoupled position and coupled position can be transmitted to a locking button via a transmission element, the transmission element or the locking button being forced into its respective displacement end position by a bistable spring element, and such a clearance for movement being provided between the uncoupling element and transmission element that, when the movement of the uncoupling element from the uncoupled position into the coupled position begins, the uncoupling element executes a displacement, which is free of the transmission element, until a just sufficiently reliable form-fitting coupling between the driver element and the outside door-handle element has taken place.

As a result, until the just sufficiently reliable form-fitting coupling between the driver element and the outside door-handle element has been reached, on account of the clearance for movement, the mechanism for the locking button does not have to be moved. This also means, however, that the forces which have to be overcome in order to actuate this mechanism need not yet be overcome, with the result that, on account of the resistances which have to be overcome only being small, it is possible to achieve a short actuating time.

The resistances which have to be overcome are constituted, on the one hand, by the frictional resistances of the mountings of the transmission element and locking button and, on the other hand, by the bistable-spring-element forces which have to be overcome. The forces of the bistable spring element have to be relatively high in order for the respectively assumed positions of the components of the door-locking device to be reliably maintained even in extreme situations, with high accelerating forces, during operation of the motor vehicle.

The necessary actuating time is further reduced in that the uncoupling-element displacement which has to be overcome is kept short.

This achieves an actuating time of the order of magnitude of 50 ms, which is short enough, during normal actuation of the outside door handle, for coupling between the driver element and the outside door-handle element, once actuation has begun, to take place more quickly than does the mechanical actuation of the outside door-handle element by the actuating individual during continued actuation of the outside door handle. An uncoupled position of the coupling is thus reached quickly enough for convenience not to be compromised by one having to wait or actuate the outside door handle twice.

The mobile authorization unit here is advantageously a transmitter, of which the in particular coded authorization signal can be picked up by a receiver of the control unit.

In order to ensure the clearance for movement between the uncoupling element and the transmission element, it is possible to arrange between the uncoupling element and transmission element a spring of considerably lesser force than the spring of the bistable spring element but greater force than the spring force of the coupling, by means of which the uncoupling element is forced in the uncoupling direction.

As a result of this spring being of lesser force than the bistable spring element, which may be a tilting spring, the movement of the uncoupling element reliably takes place first of all, before the transmission element and locking button are also moved. The lesser spring force of the coupling, in turn, cannot compress the spring of the non-actuated uncoupling element.

In a straightforward and installation-space-saving configuration, the uncoupling element may be a two-armed uncoupling lever which can be pivoted about a pin and of which one end can force the coupling to move and the other end can be driven in a pivotable manner by the drive.

The drive here is preferably an electromotive reversing drive.

If the pin is a pin element which can be driven such that it can be pivoted by the transmission element and on which the uncoupling lever is mounted such that it can be pivoted freely by the clearance for movement, then it is likewise the case that only a small amount of installation space is necessary.

The transmission element may be a transmission lever which has one end arranged firmly on the pin element and of which the other end can be forced to pivot by the locking button.

If the outside door-handle element is an outside handle lever, which can be pivoted freely about a second pin, and the driver element is a driver lever, which can be pivoted freely about the second pin, it being possible for the outside handle lever to be driven in a pivotable manner by virtue of the outside handle being actuated and for the catch to be forced to move by the driver lever, a compact structural unit of straightforward construction is achieved.

The coupling advantageously has a coupling element which can be moved by the spring force of a coupling spring from its uncoupled position into a coupled position in which the outside handle lever and driver lever are connected with a just sufficiently reliable form fit.

If the inside door-handle element is an inside handle lever which can be pivoted freely about the second pin and can be driven in a pivotable manner by virtue of the inside door handle being actuated, and if the coupling element can be moved from the uncoupled position, beyond the just sufficiently reliable form-fitting connection between the outside handle lever and driver lever, into a fully coupled position, in which the inside handle lever is connected in a form-fitting manner to the driver lever and the outside handle lever, then, when the outside door handle of the locked door-locking device is actuated, the operation of moving the coupling element in its coupled position which provides a just sufficiently reliable form-fitting connection takes place with the inside door-handle mechanism uncoupled. This also means that it is not necessary to overcome any resistances which obstruct the operation of moving the coupling element quickly into its coupled position which provides a sufficiently reliable form-fitting connection.

In order to achieve a compact, flat and thus installation-space-saving construction, it is possible for the outside handle lever and driver lever to be arranged parallel one beside the other such that they can be pivoted about the second pin, the outside handle lever having a radially extending outside handle stop and the driver lever having a radially extending driver stop, of which the stop surfaces are directed toward one another, and it being possible for the coupling element to be moved radially in the direction of the second pin from its uncoupled position, in which it is located radially outside the region of the outside handle stop and driver stop, between the two stop surfaces and into its coupled position which provides a just sufficiently reliable form-fitting connection.

This compact construction is also largely maintained when, in addition, the inside handle lever is arranged parallel alongside the outside handle lever and driver lever, such that it can be pivoted about the second pin, and has a radially extending inside handle stop, of which the stop surface is directed toward the stop surface of the driver stop and the radial extent is smaller than the radial extent of the outside handle stop and driver stop, it being possible for the coupling element to be moved radially in the direction of the second pin from its uncoupled position, beyond the coupled position between the stop surfaces of the outside handle stop and driver stop, this position providing a just sufficiently reliable form-fitting connection, between the stop surfaces of the inside handle stop and driver stop and into the fully coupled position.

The radially smaller extent of the inside handle stop in relation to the radial extent of the outside handle stop and driver stop ensures that the inside door-handle mechanism can only be actuated when the coupling element is in the fully coupled position.

In a straightforward and space-saving manner, the coupling element may be a coupling slide which is guided such that it can be displaced radially in relation to the second pin, and has a coupling stop which extends parallel to the second pin and can be moved between the stop surfaces.

A flat, installation-space-saving construction is also achieved if the first pin and the second pin extend parallel to one another and the coupling slide has an uncoupling stop which can be forced to move in the uncoupling direction by the uncoupling lever.

An exemplary embodiment of the invention is described in more detail hereinbelow and illustrated in the drawing, in which:

BRIEF DESCRIPTION OF THE INVENTION

Figure 8:
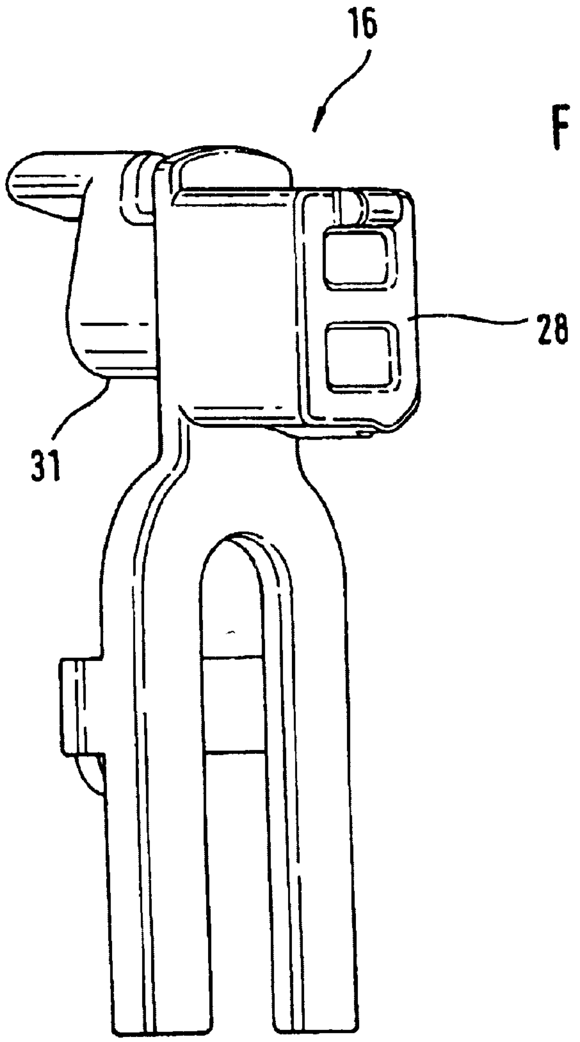
Figure 9:
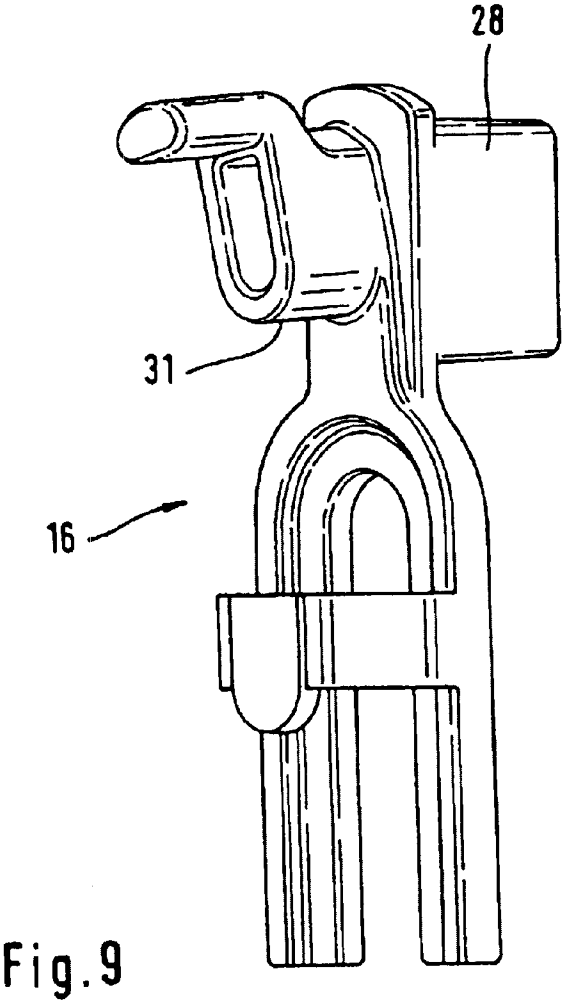
Figure 10:
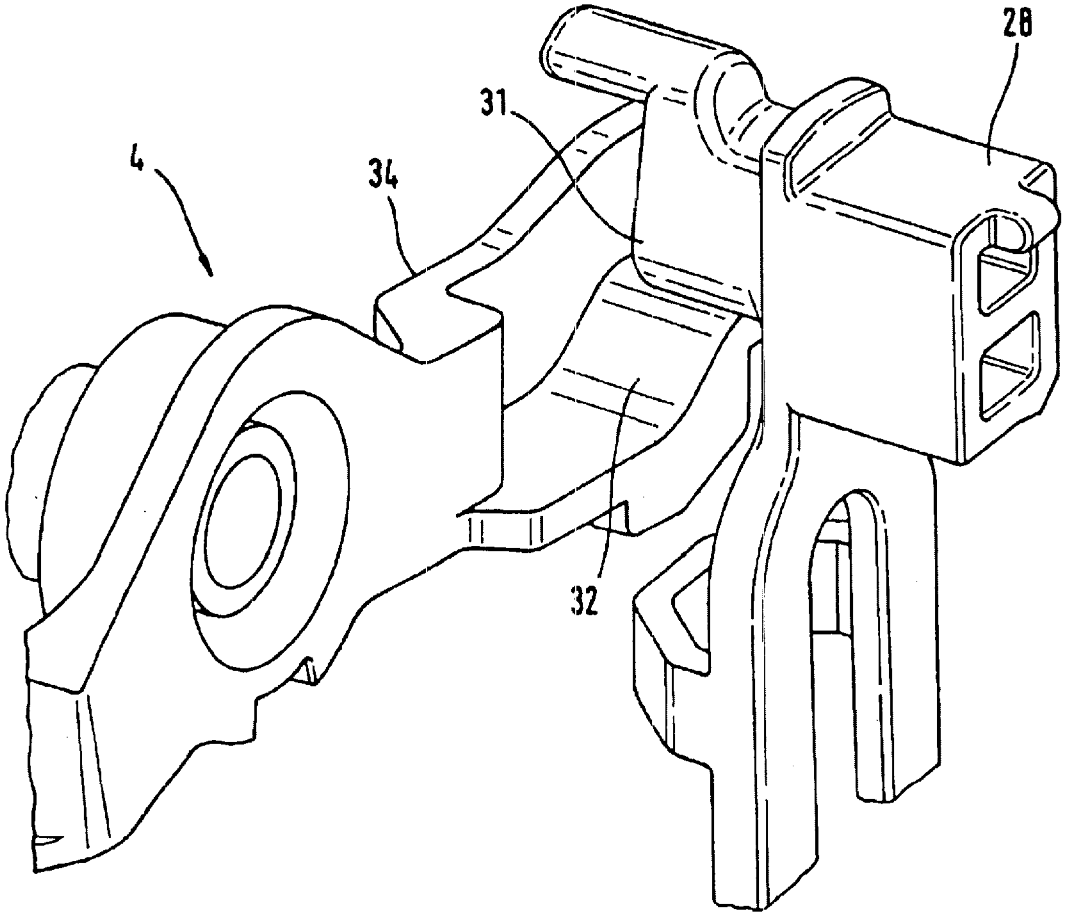
Figure 11:
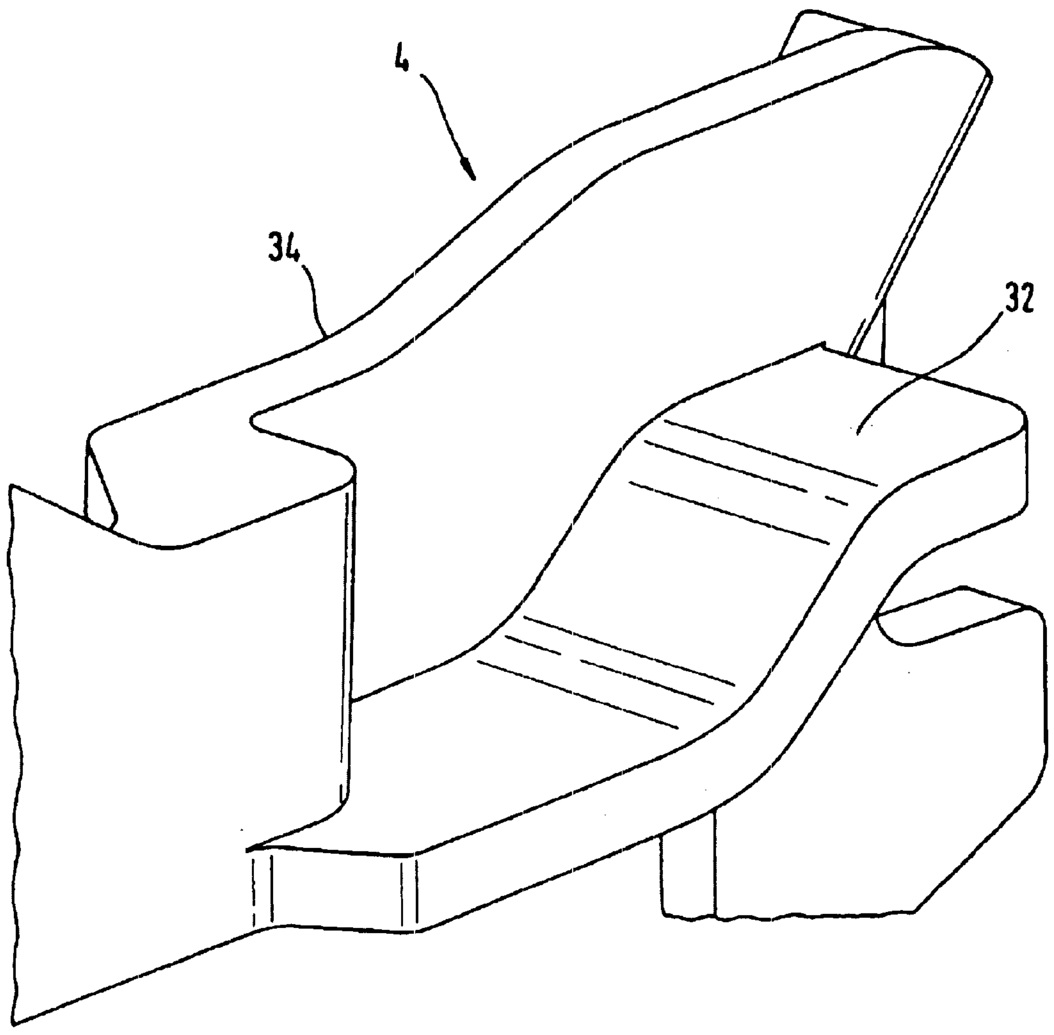
Figure 12:
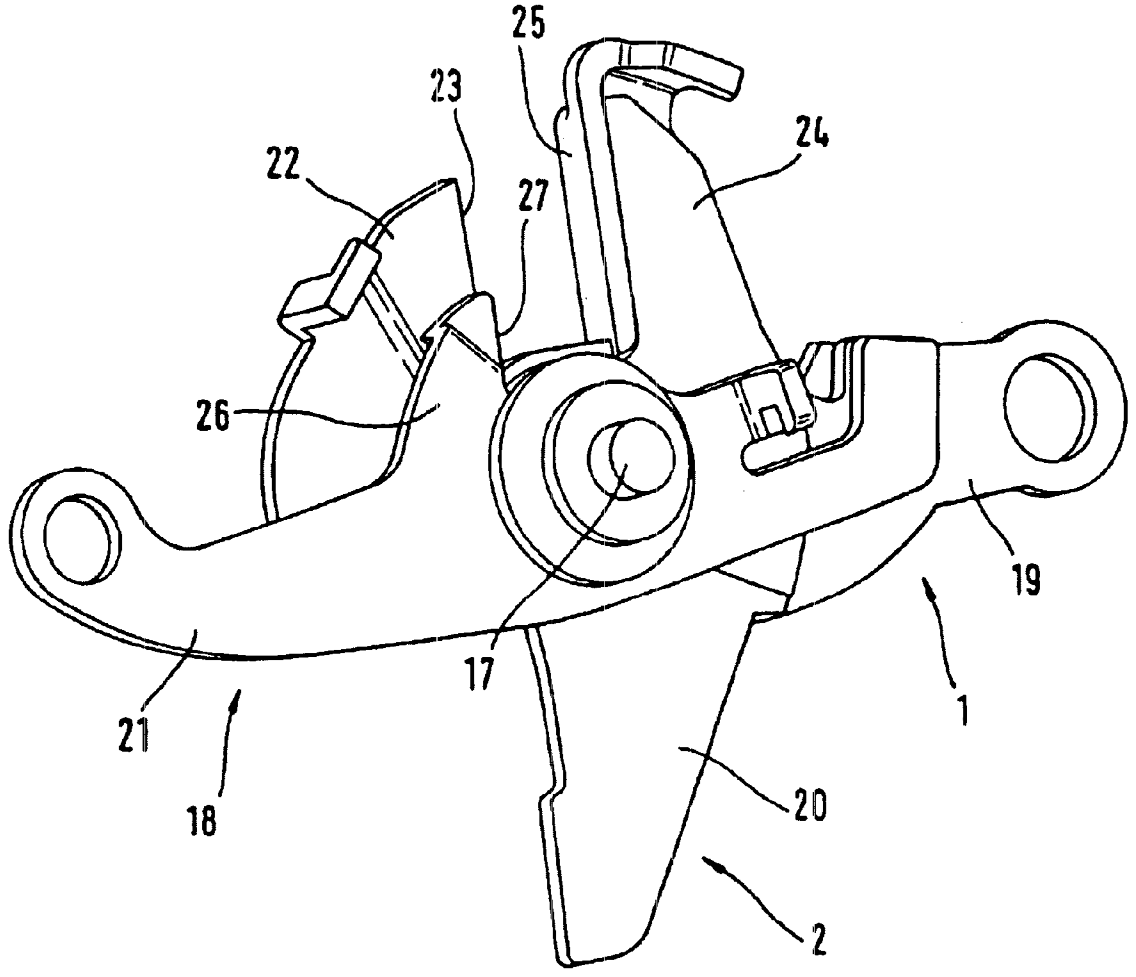

FIG. 1 shows a front view of a door-locking device in the non-actuated, uncoupled closed position, FIG. 2 shows the rear view of the door-locking device according to FIG. 1 in the non-actuated, uncoupled closed position, FIG. 3 shows the rear view of the locking device according to FIG. 1 in the actuated, uncoupled closed position, FIG. 4 shows the front view of the door-locking device according to FIG. 1 in the actuated first coupled open position, FIG. 5 shows the rear view of the door-locking device according to FIG. 1 in the actuated first coupled open position, FIG. 6 shows the front view of the door-locking device according to FIG. 1 in the actuated fully coupled open position, FIG. 7 shows the rear view of the door-locking device according to FIG. 1 in the actuated fully coupled open position, FIG. 8 shows a perspective front view of a coupling slide of the door-locking device according to FIG. 1, FIG. 9 shows a perspective rear view of a coupling slide of the door-locking device according to FIG. 8, FIG. 10 shows a perspective front view of the actuating region of the coupling slide and uncoupling lever of the door-locking device according to FIG. 1, FIG. 11 shows a perspective front view of the actuating region of the uncoupling lever according to FIG. 10, and FIG. 12 shows a perspective front view of the subassembly comprising the uncoupling lever, outside handle lever, driver lever and inside handle lever.

DETAILED DESCRIPTION OF THE PREFERRED EMBODIMENT

The door-locking device illustrated in the figures has a second pin 17, on which an outside handle lever 1, a driver lever 2 and an inside handle lever 18 are mounted in a freely rotatable manner one beside the other. The outside handle lever 1 is a two-armed lever, of which the first lever arm 19 can be pivoted by an outside door handle 51 when the latter is actuated. The second lever arm of the outside handle lever forms an outside handle stop 22 with a stop surface 23.

The driver lever 2 is likewise a two-armed lever, the first lever arm of which actuates a catch 53 of a door lock. The second lever arm of the driver lever 2 forms a driver stop 24 with a stop surface 25.

The inside handle lever 18 is likewise a two-armed lever, of which the first lever arm 21 can be pivoted by an inside door handle 50 when the latter is actuated. The second lever arm of the inside handle lever 18 forms an inside handle stop 26 with a stop surface 27.

As seen in the radial circumferential direction, the stop surface 25 of the driver stop 24 is directed toward the stop surfaces 23 and 27 of the outside handle stop 22 and the inside handle stop 26, the stop surface 27 of the inside handle stop 26 having a smaller radial extent, starting from the second pin 17, than the stop surfaces 23 and 25, which extend equally far in the radial direction, of the outside handle stop 22 and of the driver stop 24.

A coupling slide 16 of a coupling 3 is arranged such that it is guided in a radially displaceable manner on the second pin 17, and has a coupling stop 28 which projects axially in relation to the second pin 17, extends over the width of the outside handle lever 1, driver lever 2 and inside handle lever 18 and can be moved radially inward from an uncoupled position (FIGS. 1 to 3) radially outside the stop surfaces 23, 25 and 27 first of all into a first coupled open position. In this first coupled open position, the coupling stop 28 is located in a gap formed between the stop surfaces 23 and 25 of the outside handle stop 22 and driver stop 24, but still radially outside the stop surface 27 of the inside handle stop 26. In this first coupled open position (FIGS. 4 and 5), the coupling, stop 28 produces a sufficiently reliable form-fitting connection between the outside handle lever 1 and the driver lever 2 and, when the outside handle lever 1 is pivoted in the opening direction 29, said connection results in this pivoting movement being transmitted to the driver lever 2. The catch of the door lock is thus forced in the open direction by the first lever arm 20 of said driver lever.

As the coupling slide 16 continues to move radially in the direction of the second pin 17, the coupling stop 28 additionally passes into a gap which is formed between the stop surface 25 of the driver stop 24 and the stop surface 27 of the inside handle stop 26, and is a radially directed continuation of the gap between the stop surfaces 23 and 25 of the outside handle stop 22 and of the driver stop 24.

In this fully coupled open position (FIGS. 6 and 7), pivoting both of the outside handle lever 1 in the opening direction 29 and of the inside handle lever 18 in the opening direction 30 results in this pivoting movement being transmitted to the driver lever 2 and in the catch of the door lock being forced in the opening direction. The radial movement of the coupling slide 16 in the direction of the second pin 17 takes place by the coupling slide 16 being actuated correspondingly by a firmly supported coupling spring 14 in the form of a compression spring.

The coupling slide 16 also has an uncoupling stop 31, which likewise projects axially in relation to the second pin 17, has a displacement stop 32 of an uncoupling lever 4 engaging beneath it and by means of which the coupling slide 16 can be forced to move radially outward counter to the force of the coupling spring 14.

The uncoupling lever 4 is a two-armed lever which is mounted on a pin element 12 such that it can be pivoted by a certain clearance for movement 33.

The pivot axis of the uncoupling lever 4, and thus also of the likewise pivotably mounted pin element 12, extends parallel to the second pin 17. The lever stop 32 is arranged at the free end of one lever arm 34 of the uncoupling lever 4, while a reversing motor 9 acts at the free end of the other lever arm 35, it being possible for the uncoupling lever 4 to be driven in a pivotable manner by said drive. In order to limit the clearance for movement 33, the uncoupling lever 4 has stops 36 in the region of the pin element 12 and the pin element 12 likewise has stops 37, against which the stops 36 of the uncoupling lever 4 come into abutment when the latter is pivoted.

By means of a spring 11, the uncoupling lever 4 is forced, in relation to the pin element 12, in a direction in which the coupling slide 16 is disengaged from the stop surfaces 23, 25 and 27. Since the force of said spring 11 is greater than the force of the coupling spring 14, the spring 11 is compressed in the non-actuated, uncoupled locked position illustrated in FIGS. 1 to 3.

A radially projecting transmission lever 10 is arranged firmly on the pin element 12 and can be pivoted between two end positions by a locking rod 38, which is articulated on it and can be displaced longitudinally via a locking button 15. A tilting spring 13, which forms a bistable spring element, forces the transmission lever 10, and thus also the pin element 12, into the respective end position. This tilting spring 13 has a considerably higher prestressing force than the spring 11.

If an individual who is carrying a mobile authorization unit 6 approaches the locked motor vehicle, which contains the door-locking unit, to the extent where the authorization signal 7 which is permanently emitted by the mobile authorization unit 6 is received by a receiver in a control unit 5 in the motor vehicle, then said authorization signal 7 is checked for validity of authorization in the control unit 5. If the authorization is valid, the control unit 5 is thus brought into a state in which, with the additional presence of a signal from a switch 8, it allows the reversing motor 9 to pivot the uncoupling lever 4 from its uncoupled and closed position (FIGS. 1 to 3) into its first coupled open position (FIGS. 4 and 5).

The signal from the switch 8 is initiated by the individual at the beginning of actuation of the outside door handle for the purpose of opening the door and is fed to the control unit 5.

When the uncoupling lever 4 is pivoted from the closed position into the first coupled open position, the pin element 12, under the action of the tilting spring 13, remains in its closed position since initially only the clearance for movement 32 between the pin element 12 and uncoupling lever 4 is overcome, with the spring 11 being compressed in the process.

By virtue of the coupling slide 16 being actuated by the coupling spring 14, the coupling slide 16 follows the movement of the displacement stop 32 on the uncoupling lever 4 and, following a displacement 39, passes into its first coupled open position (FIGS. 4 and 5), in which the outside handle lever 1 and driver lever 2 are connected in a just sufficiently reliable form-fitting manner.

Since, on the one hand, only the small force of the spring 11 and the bearing friction in the mounting of the uncoupling lever 4 have to be overcome and, on the other hand, the pivoting path of the uncoupling lever 4 and the displacement 39 of the coupling slide 16 until the first coupled open position has been reached are short, this movement can be carried out by the reversing motor in a time of approximately 50 ms. This time is short enough for said form-fitting connection to be produced as early as when the outside handle lever 1 is pivoted in the opening direction 29 by normal continued actuation of the outside door handle. By virtue of the already form-fitting connection to the driver lever 2, the latter is pivoted in the opening direction 30 and forces the catch open, with the result that the individual can open the door.

Since the reversing motor continues running, the uncoupling lever 4 is also pivoted further and, on the one hand, allows continued displacement of the coupling slide 16 into its fully coupled open position (FIGS. 6 and 7), in which a form-fitting connection between the inside handle lever 18 and the driver lever 2 is also produced and it is thus also possible to open the door-locking device by means of the inside door handle.

On the other hand, once the clearance for movement 33 between the uncoupling lever 4 and the pin element 12 has been overcome, the pin element 12 is pivoted by the uncoupling lever 4 such that the locking rod 38 and the locking button 15 are moved into their open position via the transmission lever 10.

I claim:

1. A door-locking device, in particular for a motor vehicle, comprising an inside door-handle element moveable from a closed position into an open position by an inside door handle being actuated, having an outside door-handle element which moveable from a closed position into an open position by an outside door handle being actuated, and a driver element couplable in a form-fitting manner to the inside door-handle element and/or the outside door-handle element by a coupling and moveable from an uncoupled closed position into a coupled open position by the inside door-handle element and/or the outside door-handle element and by means of which, in the coupled state, a catch of a door lock can be actuated, wherein the coupling is driveable to move counter to a spring force from its coupled position into its uncoupled position by an uncoupling element, and an authorization signal can be directed in a contactless manner to a control unit by a mobile authorization unit, and the outside door handle is assigned a switch by means of which, when actuation of the outside door handle begins, a signal is produceable and directed to the control unit and, when said signal and the authorization signal are present, a drive is activateable by the control unit such that the uncoupling element is driveable to move from its uncoupled position into its coupled position by the drive, wherein displacement of the uncoupling element between the uncoupled position and coupled position is transmittable to a locking button (15) via a transmission element, that the transmission element or the locking button (15) is forced into its respective displacement end position by a bistable spring element, and such a clearance for movement (33) is provided between the uncoupling element and transmission element that, when the movement of the uncoupling element from the uncoupled position into the coupled position begins, the uncoupling element executes a displacement, which is free of the transmission element, until a just sufficiently reliable form-fitting coupling between the driver element and the outside door-handle element has taken place.

2. The door-locking device as claimed in claim 1, wherein the mobile authorization unit (6) is a transmitter, of which the transmission signal can be picked up by a receiver of the control unit (5).

3. The door-locking device as claimed in claim 1, wherein arranged between the uncoupling element and transmission element is a spring (11) of considerably lesser force than force of the bistable spring element but greater force than spring force of the coupling (3), by means of which the uncoupling element is forced in the uncoupling direction.

4. The door-locking device as claimed in claim 1, wherein the uncoupling element is a two-armed uncoupling lever (4) which is pivotable about a pin and of which one end can force the coupling (3) to move and the other end is driveable in a pivotable manner by the drive.

5. The door-locking device as claimed in claim 1, wherein the drive is an electromotive reversing drive (9).

6. The door-locking device as claimed in claim 4, wherein the pin is a pin element (12) which is driveable such that it is pivotable by the transmission element and on which the uncoupling lever (4) is mounted such that it is pivotable freely by clearance for movement (33).

7. The door-locking device as claimed in claim 6, wherein the transmission element is a transmission lever (10) which has one end arranged firmly on the pin element (12) and of which the other end can be forced to pivot by the locking button (15).

8. The door-locking device as claimed in claim 4, wherein the outside door-handle element is an outside handle lever (1), which is pivotable freely about a second pin (17), and the driver element is a driver lever (2), which is pivotable freely about the second pin (17), wherein it being possible for the outside handle lever (1) to be driven in a pivotable manner by the outside handle being actuated and the catch to be forced to move by the driver lever (2).

9. The door-locking device as claimed in claim 8, wherein the coupling (3) has a coupling element which is moveable by force of a coupling spring (14) from its uncoupled position into a coupled position in which the outside handle lever (1) and driver lever (2) are connected with a just sufficiently reliable form fit.

10. The door-locking device as claimed in claim 8, wherein the inside door-handle element is an inside handle lever (18) which is pivotable freely about pin (17) and driveable in a pivotable manner by the inside door handle being actuated, and the coupling element is moveable from the uncoupled position, beyond a just sufficiently reliable form-fitting connection between the outside handle lever (1) and driver lever (2), into a fully coupled position, in which the inside handle lever (18) is connected in a form-fitting manner to the driver lever (2) and the outside handle lever (1).

11. The door-locking device as claimed in claim 1, wherein the outside handle lever (1) and the driver lever (2) are arranged parallel one beside the other such that they are pivotable about the pin (17), the outside handle lever (1) having a radially extending outside handle stop (22) and the driver lever (2) having a radially extending driver stop (24), of which stop surfaces (23, 25) are directed toward one another, and the coupling element can be moved radially in the direction of the pin (17) from its uncoupled position, in which it is located radially outside a region of the outside handle stop (22) and driver stop (24), between the two stop surfaces (23, 25) and into its coupled position which provides a just sufficiently reliable form-fitting connection.

12. The door-locking device as claimed in claim 11, wherein the inside handle lever (18) is arranged parallel alongside the outside handle lever (1) and the driver lever (2), such that it is pivotable about the pin (17), and has a radially extending inside handle stop (26), of which stop surface (27) is directed toward the stop surface (25) of the driver stop (24) and radial extent is smaller than radial extent of the outside handle stop (22) and driver stop (24), wherein for the coupling element to be moved radially in direction of the pin (17) from its uncoupled position, beyond the coupled position between the stop surfaces (23, 25) of the outside handle stop (22) and driver stop (24), this position providing a just sufficiently reliable form-fitting connection, between the stop surfaces (27, 25) of the inside handle stop (26) and driver stop (24) and into fully coupled position.

13. The door-locking device as claimed in claim 12, wherein the coupling element is a coupling slide (16) which is guided such that it is displaceable radially in relation to the pin (17), and has a coupling stop (28) which extends parallel to the pin (17) and is moveable between the stop surfaces (23, 25, 27).

14. The door-locking device as claimed in claim 13, wherein a first pin and the pin (17) extend parallel to one another and the coupling slide (16) has an uncoupling stop (31) which can be forced to move in uncoupling direction by uncoupling lever (4).

15. The door-locking device as claimed in claim 8, wherein the uncoupling element is an uncoupling lever (4) which is pivotable about a pin which is a pin element (12) which is driveable such that it is pivotable by the transmission element and on which the uncoupling lever (4) is mounted such that it is pivotable freely by clearance for movement (33).

16. The door-locking device as claimed in claim 15, wherein the transmission element is a transmission lever (10) which has one end arranged firmly on the pin element (12) and of which the other end can be forced to pivot by the locking button (15).

* * * * *